Figure 1:
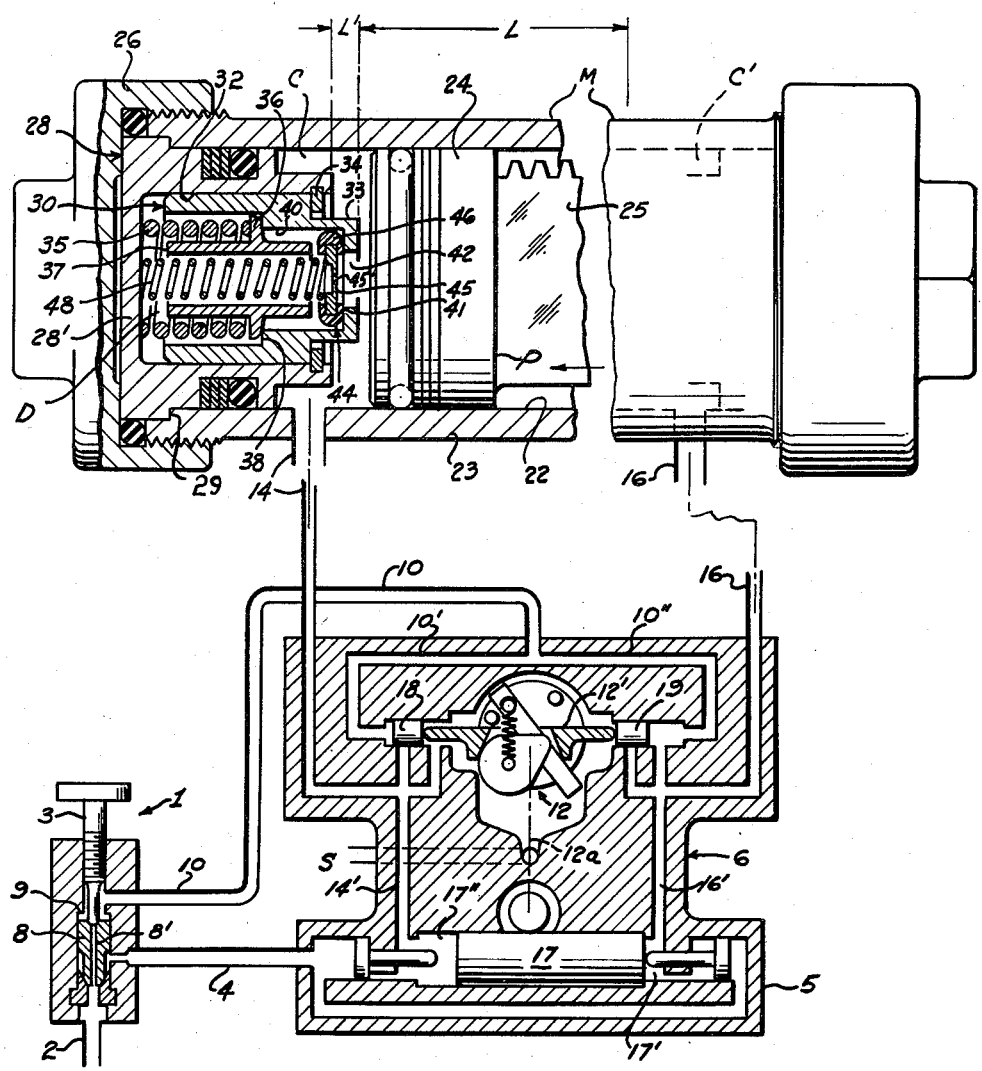

United States Patent Office 2,935,051
Patented May 3, 1960

2,935,051

FLUID OPERATED RECIPROCATING MOTORS

John L. Fuller and Robert L. Dangler, Shaker Heights, Ohio, assignors to Curtiss-Wright Corporation, a corporation of Delaware Application May 28, 1958, Serial No. 738,503

10 Claims. (Cl. 121—157)

This invention relates to a reciprocating fluid operated motor and control system therefor, particularly for causing abnormal stroke operation of the motor piston or its equivalent beyond the usual range of to and fro operation, as for parking of a windshield wiper blade or the like, operated by such motor piston, beyond the usually wiped area in a desired direction. The present improved mechanism is adapted for use in or with motor control systems and apparatus such as shown by United States Patent 2,547,175, April 3, 1951, C. R. Sacchini, and in application Serial No. 648,007, filed March 25, 1957, entitled Hydraulic Actuator Systems for Reciprocating Fluid Operated Motors, L. J. Moulton et al., which patent and application are owned by the assignee hereof. The environment of the present invention as shown herewith is substantially according to the Moulton et al. application.

In the present mechanism, as shown herewith in two different forms, hydraulic fluid is admitted through a wiper speed control or metering valve to an automatically acting toggle type reversing valve mechanism having output lines or conduits connected to the relatively opposite ends of the wiper motor cylinder or plurality of cylinders as desired and the direction of motor piston stroke is reversed as a function of rise in pressure in the working chambers of the motor or motors acting upon a direction control piston portion of or associated with the reversing valve mechanism. For arrest of the motor piston or pistons beyond normal stroke terminal positions a variable length fluid pressure operated device in each motor normally limits the stroke of the piston in one direction, and means operated as a function of decrease in the rate of fluid supplied to the motor by its metering or speed control valve mechanism operates to decrease the effective length of the device whereby to permit lengthening of the motor piston stroke in the desired direction. Two forms of the present mechanism are shown in which the variable length parking control device is supported in one case by a fixed part of the motor cylinder and in another case by the motor piston. The operation is generally similar in both cases.

An important problem in the construction of the variable length parking device is to mate its action or operation with the spring and other loading of the reversing valve mechanism and the operation of the master control valve, so that the parking operation will occur only at desired motor operating speeds or under such conditions that no damage will be done to ancillary parts such as the wiper or wiper blades or the windshield framework.

Various objects and novel features of the present invention not indicated above will become apparent from the following description of the preferred forms shown herewith. The essential characteristics are summarized in the claims.

Figure 2:
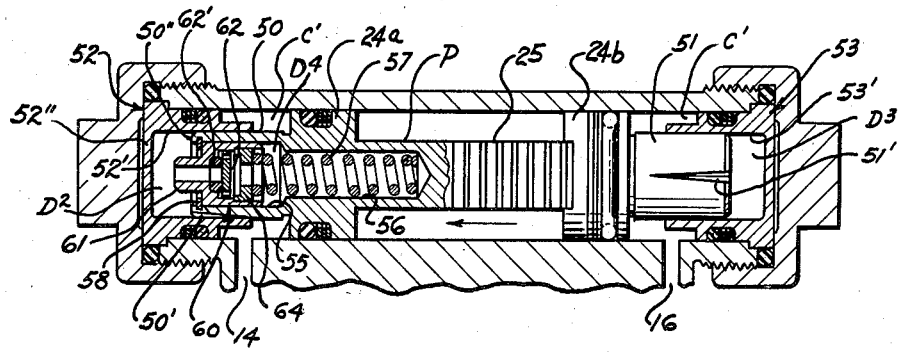
Figure 3:
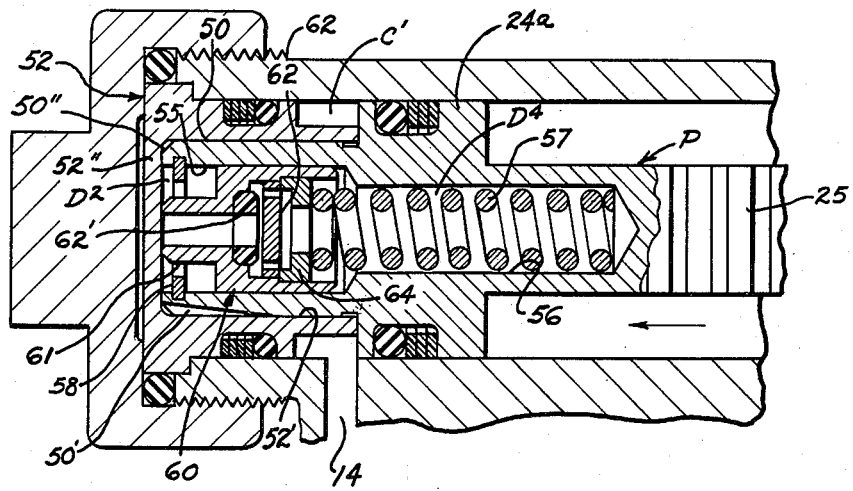

In the accompanying drawings, Fig. 1 is a principally diagrammatic hydraulic fluid control circuit including a metering valve and portions of one wiper motor approximately as shown in the Moulton et al. application but including the present parking control means in one form shown in relatively enlarged axial central section. Fig. 2 is a full scale, partly cross sectional view of a motor assembly incorporating a modified form of the present invention. Fig. 3 is a relatively enlarged central sectional fragmentary view further showing the modified form of parking control means, and with the motor piston in parked position.

Typical motor and control system

In Fig. 1 a suitable manually operated master control or metering valve unit 1, lower left, receives (e.g.) aircraft system supply fluid throg conduit 2 and, by manipulation of valve stem 3, the valve first admits fluid into a conduit 4 leading to the base portion 5 of the automatic actuator valve mechanism or unit generally indicated at 6. Such initial admission of fluid, via conduit 4, serves a special purpose fully explained and claimed in the Moulton et al. application, but which is not pertinent to the present subject invention.

Further opening operation of the master control valve 1 (raising of stem 3) permits upward movement of a tubular plug 8 until it encounters a stop 9 in the main valve body, whereupon metering of fluid takes place through and past the aperture 8' of plug 8 to the duct 10 and its branches 10' and 10" leading to a spring loaded toggle action reversing valve mechanism generally indicated at 12. In the illustrated condition or temporary relationship of parts of the reversing valve mechanism 12, motor operating fluid is blocked from entering ducts 14 and 14' (left Fig. 1) leading respectively to the left hand pressure chamber C of the motor M and to a chamber 17" of the cylinder of a direction control or reversing piston 17 in the base of unit 6, through relative positioning of fluid path reversing valve plugs 18 and 19 of mechanism 12; and meanwhile fluid is admitted from the branch portion 10" of the feed line into duct portions 16 and 16' for movement of motor piston P leftwardly. Duct 16 leads to chamber C' in the right hand end of motor M, and duct 16' leads to right hand pressure chamber 17' of reversing piston 17. The left hand pressure chamber C of motor M and the pressure chamber 17" are shown as being vented to sump at S past an operating rod 12' of toggle mechanism 12.

The toggle mechanism 12 is reversed or moved past dead center as from the illustrated position to the opposite position (not shown) and vice versa as a function of full permitted stroke movement of reversing piston 17 through operation of an interconnecting drive device indicated by broken line 12a. Portions of the mechanism 6 not described above are fully shown and described in the Moulton et al. application, Serial No. 648,007.

Referring to the upper part of Fig. 1, the motor piston P slidable in the bore 22 of motor body or cylinder 23 is made more or less similar at its opposite ends or heads 24 (one shown), and the heads are rigidly connected together by a toothed rack 25 which, through a suitable pinion and motor output shaft, not shown, reciprocates a wiper or other work element. The piston P normally moves cyclically between limits L, and, for parking of the wiper in an area beyond that usually wiped or as outlined above, the piston moves further, as to limit L' in the desired direction as will be explained.

A threaded end cap 26 closes the left end of the cylinder bore 22 and chamber C in cooperation with a cup shaped fitting 28 suitably shouldered as at 29 against the cylinder body 23. The end cap 26 and fitting 28 are shown as having more or less conventional seal assemblies. A dead-end bore 32 is the fitting 28 serves as a cylinder for a parking plunger 30 slidably occupying the bore 32; and while the left hand piston head 24 is approaching the plunger 30, or as illustrated, a tubular rightward extension 33 of the plunger is yieldably maintained in a position projecting from the right hand end of the fitting 28, or as limited by a suitable stop 34, under the influence of the compression spring 35 on a flange portion 36 of a sleeve 37 between the spring and a shoulder 38 defining part of a counterbore in the parking plunger 30. A reduced diameter bore 40 in the plunger 30 is formed at one end with a valve seat 41 around a relatively large axial opening 42 in the plunger. A valve plug assembly 44 containing an orifice plate 45 (orifice indicated 45') and including an elastic annular mounting ring 46 for the orifice plate is normally held in sealing relation to the seat 41 as by a light spring 48 bearing at one end against the orifice plate 45 and at its opposite end against the closed end or bottom wall 28' of the fitting 28.

Motor operation

Assuming that the generally closed chamber or pocket D inside the plunger 30 and fitting 28 has been filled with fluid and that the seal assembly 44 is tight against the seat 41, it will be apparent that when the head 24 of motor piston P encounters the projecting end portion 33 of the plunger 30, the pocketed fluid will, in effect, be trapped by the orifice plate 45 notwithstanding its small orifice 45, and that the piston will be stopped in its leftward movement with the left hand face of the piston head at the normal-stroke-limit diagrammatically indicated at L. In that event, pressure will build up in the right hand chamber C' of the motor M causing movement of the reversing piston 17 of actuator mechanism 6 to the left and thereby causing toggling action of the mechanism 12 and rightward movement of valve plugs 18 and 19 to reverse the fluid routing and consequently initiate a new stroke action on part of piston P or to the right. In respect to this much of the operation, it can be assumed that there is negligible leakage between the parking plunger 30 and the bore 32 in the fitting 28, or that the relatively larger spring 35 has sufficient force to overcome any tendency for such leakage to take place. The above described operation is on the assumption that the motor is operating the wipers at a cycling speed well above rated or desired minimum speed or such that leakage through the orifice 45' and/or otherwise past the plunger 30 into motor chamber C is much less than can take place elsewhere in the motor and control valve system.

Parking operation

In order to park the piston P beyond its normal stroke indicated by length and limits L, Fig. 1, the operator or attendant adjusts the speed control valve 1 toward closed position until the leakage in the motor and control valve system becomes less than tends to occur through (e.g) the orifice 45'. Thus, following a reduced speed rightward piston stroke and fluid reversing toggle action, the piston P will slowly approach its illustrated position in moving leftwardly. When the left hand face 24' of the head of the piston P encounters the projection 33 of parking plunger 30 at a wiping speed such that the pressure threshold in chamber C' necessary to operate the toggle mechanism 12 is not reached due to setting of the manual control or master valve 1 for low speed operation, the piston P will be temporarily arrested by having encountered the adjacent axial end face of the parking plunger 30; but thereafter the fluid trapped in the pocket D of the parking plunger and fitting assembly 28, 30, and 37, will be squeezed out through the orifice 45' in plate 45 into the motor chamber C (which is now at exhaust or negligible pressure) until the parking plunger 30 is stopped by the end wall 28' of the fitting 28 or the piston head 24 abuts the right hand end of fitting 28. If the control valve 1 is now allowed to stay open at approximately the same low speed setting as obtained during the parking operation just above described, the piston P will be hydraulically locked in the parked position (left limit L'). Alternatively, when the motor piston reaches the parking position, the piston can, of course, be mechanically locked by suitable means, for example that describ in the co-pending application of L. J. Moulton et al. Serial No. 738,504, filed May 28, 1958, entitled "Parking mechanisms for fluid operated reciprocating motors."

In the above described embodiment of the invention, some leakage will of course occur at times at all slidably fitted surfaces of the various components. The critical point of leakage for enabling the parking plunger 30 to function properly is at and through the orifice 45.'

To recommence normal or limited stroke, relatively high speed operation of the motor without delay or without re-wiping in the parking area, the control valve 1 is further opened to meter fluid into the motor chamber C' and reversing piston chamber 17' at the necessary high rate, hence effective higher pressure; the toggle mechanism operates to admit working pressure into the leftward chamber C of the motor (exhausting from chamber C'); and, as the working pressure rises to the point necessary to commence rightward stroke of the piston P, the valve and orifice plate assembly 44 moves quickly away from the seat 41 against the resistance of the light spring 48 thus enabling quick-fill operation to equalize the pressure within the parking plunger assembly (pocket D) with the working pressure existing in motor chamber C. As pressure equalization takes place, the spring 35 returns the parking plunger 30 to its Figure 1-illustrated position relative to the fitting 28 for arresting the piston P at normal stroke terminal position on its next succeeding stroke.

Modified parking mechanism

Referring to Figs. 2 and 3, the piston P' in this case has approximately identical head portions 24a and 24b, connecting rack portion 25 for operation of the wiper (not shown), and generally cylindrical reduced diameter portions 50 and 51 forming axial extensions of the head portions. In the Fig. 2-illustrated or approximately mid stroke position of piston P' (or at each stroke end position only if so designed) each of the cylindrical extensions 50 and 51 is in slidably fitting relationship to respective bores 52' and 53' of fittings 52 and 53 which are similar in shape to the fittings 28 of the previously described construction. The extensions 50 and 51 are adapted to form with the fittings 52 and 53 generally closed pockets D2 and D3. As the extensions 50 and 51 of the piston heads are moved axially in their respective bores 52' and 53' on successive piston strokes, the motor speed is decelerated by gradual restriction and ultimate effectual closing by the cylinder walls 52' and 53' of orifice forming, V-shaped, notches 50' and 51' in the respective extensions. This constitutes, in effect, an already well known form of shock absorbing or dash-pot device, except for association with the modified parking mechanism of Figs. 2 and 3.

The cylindrical extension 50 (at the left end only of the piston P' as shown in Figs. 2 and 3, although the construction could be duplicated at both ends if desired) has a cylindrical bore 55 forming a counterbore portion of a deeper axial bore 56 in the piston head 24a and rack portion 25. The parking plunger 60 in this case is slidably mounted as by a lap fit in the relatively large bore portion 55 of piston extension 50 and it has a tubular extension 61 normally projecting leftwardly from the end face 50" of the piston extension 50 the distance which it is desired that the piston P' shall move out of or beyond normal stroke terminal position for parking. A coil spring 57 in the pocket or cavity D4, formed by the plunger in cooperation with the bores 55 and 56, acts, in effect, on the parking plunger 60 normally to hold it against a leftward stop shown in the form of a snap ring 58 in the plunger 60. The quick fill or one-way-freely-acting valve mechanism (corresponding to valve assembly 44 etc. in the arrangement according to Fig. 1) comprises in this case a metal disc 62 with relatively unrestricted openings therethrough. The disc 62, acts as a flap valve in order to trap fluid within the pocket D4, and seats leftwardly against an elastic ring type seal 62' around a central opening in the tubular extension 61 of the parking plunger 60. In the open position of the valve disc 62 (i.e. when fluid in the pocket D4 is having its pressure equalized with the motor piston working fluid pressure) the disc is stopped by a shoulder formed on an annular return-spring-force-receiving ring 64 contained slidably in an inner or rightward counterbore of the parking plunger as clearly shown.

*Further construction and operation*

Assuming the piston P' is moving toward the left as indicated by the arrow on Fig. 2, the drain pressure in motor piston chamber C is negligible, and the pressure in chamber C' will be determined by resisting load and the setting of the speed control valve 1 until over-center operation of the reevrsing valve mechanism 12 (Fig. 1) occurs. The variable cross section or V-shaped orifice 50' and the diametral dimensional relationships of the piston extension 50 and its co-acting bore 52' are so designed that the piston P' will be arrested in its leftward stroke with the parking plunger extension 61 substantially seated against the bottom wall 52" of the fitting 52. Pressures in the dash pot cavity D2 within the fitting 52 and within the fluid trap chamber D4 will be equalized by one-way-opening operation of the valve disc 62, and the spring 57 normally holds the parking plunger 60 from moving to the right in its lap fitted bore of the piston extension 50.

In the preferred construction the V-shaped orifice 50' of piston extension 50 is made shorter axially of that extension than the orifice 51' of extension 51 by a distance which corresponds to the Fig. 2-illustrated projection of extension 61 beyond the effective piston end face 50" in order to insure that effectual dead pocketing of fluid in the chamber D2 at high speed motor operation will occur before the parking plunger extension 61 has encountered the bottom wall 52" of the fitting 52.

Continuing with the operation partially described above, when the motor fluid supply rate has been reduced by manipulation of the speed control valve 1 to the proper low point for parking, then (again assuming leftward movement of the piston P') the action of the dash pot becomes less effective due to leakage rate through the V-shaped orifice 50' than occurs during normal piston operation at high speed, and insufficient signal pressure will be built up in the motor (chamber C') to accomplish automatic reversing action of the valve mechanism 12, Fig. 1. Thereby, through controlled leakage between the outer diameter surface of the parking plunger 60 and its lap fitted bore 55, the parking plunger will be depressed against the resistance of spring 57 following contact of plunger extension 61 with the end wall 52" of fitting 52; and the motor piston P' will come to rest in the position illustrated in Fig. 3. In other words, parking will occur with the motor piston P' disposed leftwardly of its normal stroke terminal position or as shown in Fig. 3 essentially as described in connection with the construction as shown by Fig. 1, and retention of the motor piston in parked position can, for example, be assured by bleeding fluid through metering valve 1 at a low rate of flow.

In the form of the present invention according to Figs. 2 and 3, the specific or most important point of leakage which enables the parking plunger 60 to function properly as described above (in addition to unavoidable points of leakage occurring between all slidably fitted surfaces whether or not equipped with sealing ring or equivalent devices) is between the bore 55 in piston extension 50 and the parking plunger 60.

We claim:

1. Mechanism including a reciprocating fluid operated motor having two pressure chambers and an output member therebetween arranged for normally limited stroke operation in relatively opposite directions, a supply source of operating fluid for the motor and a metering valve therefor, an automatic direction control or fluid reversing valve between the metering valve and the motor arranged to apply fluid from said source alternately to the motor pressure chambers, and wherein the direction control valve is rendered operative to effect fluid reversing, as a function of rise in pressure in a then acting one of the motor pressure chambers at terminal stroke of the motor output member, characterized by employment of a variable length fluid pressure operated device in the motor normally limiting the stroke of the motor output member in one direction, and means operated as a function of decrease in rate of fluid supply to the motor through the metering valve and operating to decrease the effective length of the device in said direction, whereby to permit lengthening of motor output member stroke in that direction.

2. The mechanism according to claim 1, wherein the motor has a cylinder closed at one end and the output member is a piston sildable in the cylinder; the variable length device is a plunger slidable in the closed end portion of the cylinder and normally spring biased toward the piston against a fixed stop carried by the cylinder; further characterized in that a one way freely acting valve carried by the plunger traps fluid from the associated pressure chamber of the motor behind the plunger, and orifice means associated with the plunger bleeds fluid from the trap into said associated pressure chamber to permit lengthened stroke operation of the motor piston.

3. The mechanism according to claim 2, wherein the one way freely acting valve is a plug which is spring loaded against a seat associated with an axial port in the plunger, and the orifice means is a restricted opening through the plug.

4. The mechanism according to claim 1, wherein the motor has a cylinder closed at one end and a piston slidable in the cylinder; characterized particularly in that the variable length device is a plunger slidable in an axial bore of the piston and having a portion normally disposed for abutment with cooperating abutment means carried by the cylinder; the piston has a pocket normally approximately closed by the plunger; the plunger has a one way freely acting valve leading into the pocket and arranged for reception of motor-operating fluid into the pocket, and orifice means is arranged to permit controlled egress of fluid from the pocket to enable lengthened stroke operation of the motor piston.

5. The mechanism according to claim 4, wherein the closed end portion of the cylinder is telescoped by an end portion of the piston at each stroke of the piston toward said closed end, and an orifice of variable capacity according to piston position is formed between the telescoping portions and functions as a dash pot or piston deceleration rate control means.

6. The mechanism according to claim 4, wherein the orifice means is constituted by predetermined clearance between the plunger and its coacting bore in the motor piston.

7. In a reciprocating hydraulic motor mechanism having a piston adapted for automatic operation by fluid metered to pressure chambers associated with the piston from a supply system and including a spring loaded, motor actuating fluid pressure operated, motor-fluid-reversing valve mechanism having an operating pressure threshold capable of causing motor reversal, a normal stroke limiting hydraulic device associated with the piston to oppose motor operation in one direction beyond a predetermined stroke limit, said device having an extensible and collapsible generally closed chamber normally containing a predetermined volume of fluid under substantial pressure, and a vent orifice connected with the chamber for enabling collapsing of the chamber, hence lengthening of motor stroke in one direction, when operating fluid is being metered to the motor at a rate below that necessary to maintain threshold pressure for operation of the reversing valve mechanism.

8. In a fluid operated reciprocating piston motor mechanism of the type having working chambers for the piston and an automatic cycling or piston-reversing valve mechanism operating as a function of predetermined rise in pressures in the working chambers of the motor, and a motor speed control valve for varying motor-operating fluid admission rate to the motor; a fluid operated device associated with the piston and extensible and retractible in the direction of motor piston movement arranged normally to limit movement of the motor piston to a predetermined normal stroke in one direction through the intermediary of a column of motor-operating fluid operatingly trapped within the device in a manner to oppose its movement, the device having a bleed orifice for the operatingly trapped fluid communicating with its associated motor piston chamber, whereby, when the rate of admission of fluid to the motor by the speed control valve is reduced to a predetermined value less than will effect re-cycling or reversing operation of the motor, the orifice permits dissipation of fluid from the column to enable the motor piston to come to rest in a position beyond its normal-stroke-limited position.

9. In a reciprocating hydraulic motor mechanism comprising a fixed member having relatively opposed pressure chambers, a cooperating movable pressure operated member for connection with a load, automatic valve means for effecting alternate admission of pressure fluid to one chamber while connecting the other to drain, and a manual control valve for metering pressure fluid to the valve means, a parking plunger slidable in a dead end bore of one member and a one-way-opening valve carried by the plunger for enabling free communication between said bore and one of the pressure chambers whenever fluid at motor operating pressure is being admitted to that chamber by the automatic valve means, said parking plunger and the other member of the motor having coacting abutment surfaces normally limiting the stroke of the movable member in one direction, and a spring connected for action on the plunger normally to hold it in stroke-limiting position, a peripheral surface of the plunger and an adjacent surface of said bore constituting a restricted orifice normally preventing egress of fluid from said bore but permitting egress of fluid therefrom when the rate of fluid supply through the manual control valve is reduced by a predetermined amount.

10. In a hydraulically operated windshield wiper motor having a cylinder and a reciprocating piston therein, an automatic reversing valve means operated by hydraulic fluid pressure rise at normal terminal piston stroke, a variable length abutment device between the motor piston and its cylinder operative normally to limit the piston stroke in one direction for wiping a predetermined area, said abutment device including an approximately closed chamber for hydraulic fluid, a one-way-opening valve arranged for freely admitting motor-operating fluid into the chamber, and orifice means controlling egress of fluid from the chamber to permit operation of the piston beyond normal stroke position for parking of a wiper connected to said piston beyond said predetermined area.

References Cited in the file of this patent
UNITED STATES PATENTS

| | | |
|---|---|---|
| 2,302,232 | MacNeil | Nov. 17, 1942 |
| 2,632,196 | Rappl | Mar. 24, 1953 |